(12) United States Patent
Higgins

(10) Patent No.: US 6,831,921 B2
(45) Date of Patent: Dec. 14, 2004

(54) WIRELESS INTERNET ACCESS SYSTEM

(76) Inventor: James A. Higgins, 3151 Shallow Springs Ter., Chico, CA (US) 95928

( * ) Notice: Subject to any disclaimer, the term of this patent is extended or adjusted under 35 U.S.C. 154(b) by 25 days.

(21) Appl. No.: 10/108,021

(22) Filed: Mar. 27, 2002

(65) Prior Publication Data

US 2003/0185169 A1 Oct. 2, 2003

(51) Int. Cl.[7] ............................................... H04L 12/56

(52) U.S. Cl. ...................... 370/401; 375/222; 370/338; 370/420; 709/223

(58) Field of Search .............................. 370/408, 310.2, 370/315, 328, 334, 338, 339, 349, 400–402, 420, 463, 465, 466, 471, 474, 422; 375/222; 709/223

(56) References Cited

U.S. PATENT DOCUMENTS

| | | | |
|---|---|---|---|
| 5,463,671 A | | 10/1995 | Marsh et al. |
| 5,574,775 A | | 11/1996 | Miller, II et al. |
| 5,648,969 A | | 7/1997 | Pasternak et al. |
| 5,661,723 A | | 8/1997 | Ueno et al. |
| 5,778,116 A | | 7/1998 | Tomich |
| 5,787,080 A | | 7/1998 | Hulyalkar et al. |
| 5,822,324 A | * | 10/1998 | Kostresti et al. ............ 370/487 |
| 5,867,485 A | * | 2/1999 | Chambers et al. .......... 370/281 |
| 5,907,540 A | | 5/1999 | Hayashi |
| 5,936,949 A | | 8/1999 | Pasternak et al. |
| 5,960,344 A | * | 9/1999 | Mahany .................... 455/432.2 |
| 5,970,062 A | | 10/1999 | Bauchot |

(List continued on next page.)

FOREIGN PATENT DOCUMENTS

WO  WO 99/46899  9/1999

OTHER PUBLICATIONS

Schiff, Abstract of *High Speed Wireless Access*, 11th IEEE International Symposium on Personal Indoor and Mobile Radio Communications, 2000, p. 873–877, vol. 2.

Eng et al., Abstract of *An Efficient Wireless Internet Access System*, GLOBECOM 97: IEEE Global Telecommunications Conference, 1997, p. 1855–1860, vol. 3.

Primary Examiner—Dang Ton
Assistant Examiner—Tri H. Phan
(74) Attorney, Agent, or Firm—Gray Cary Ware & Freidenrich, LLP; Andrew V. Smith

(57) ABSTRACT

A wireless network access system and method that provides a multiplicity of access point devices, each being capable of relaying information. The upstream network access may include an omni-directional antenna for downstream communications. The wireless network is provided as a tree structure wherein each access point feeds back to a higher access point of the multiplicity of access point devices. The described system does not employ routers, and thereby speeds processing time and reduces network latency and costs associated with a mesh network employing routers. A multiplicity of customer premise wireless network devices are provided with a wireless modem for communication from the customer premise limited to a path all the way back to a main gateway upstream to the wired side of the network where the gateway provides a T3 or other high speed Internet connection. Each customer premise wireless network access device includes a directional antenna connected to the wireless modem and an interface adapted for conveying bidirectional data signals. The wireless modem and the directional antenna are locatable in an environmental enclosure outside the customer premise for communication with an upstream network access device. Anything that comes in on the wireless side has to go out on the wired side, i.e., via the gateway. The relay points for communicating information via the access point devices provide filtering, e.g., on the Ethernet hub, such that communications is limited as between the downstream customer premise and the access point providing service only upstream communication directly to the gateway.

40 Claims, 9 Drawing Sheets

U.S. PATENT DOCUMENTS

| | | | |
|---|---|---|---|
| 5,983,068 A | | 11/1999 | Tomich et al. |
| 6,009,096 A | * | 12/1999 | Jaisingh et al. .......... 370/310.1 |
| 6,014,546 A | * | 1/2000 | Georges et al. ............... 725/79 |
| 6,049,593 A | | 4/2000 | Acampora |
| 6,069,885 A | | 5/2000 | Fong et al. |
| 6,154,461 A | * | 11/2000 | Sturniolo et al. ........... 370/401 |
| 6,198,728 B1 | | 3/2001 | Hulyalkar et al. |
| 6,215,779 B1 | | 4/2001 | Bender et al. |
| 6,249,516 B1 | * | 6/2001 | Brownrigg et al. ......... 370/338 |
| 6,259,898 B1 | | 7/2001 | Lewis |
| 6,272,120 B1 | | 8/2001 | Alexander |
| 6,314,163 B1 | | 11/2001 | Acampora |
| 6,323,980 B1 | | 11/2001 | Bloom |
| 6,452,915 B1 | | 9/2002 | Jorgensen |
| 6,496,105 B2 | * | 12/2002 | Fisher et al. ........... 340/310.01 |
| 6,512,755 B1 | * | 1/2003 | Deschaine et al. .......... 370/338 |
| 6,560,213 B1 | * | 5/2003 | Izadpanah et al. .......... 370/338 |
| 6,591,084 B1 | * | 7/2003 | Chuprun et al. ........... 455/3.05 |
| 6,640,100 B1 | * | 10/2003 | Kojima et al. ............. 455/11.1 |
| 6,665,536 B1 | * | 12/2003 | Mahany ...................... 455/434 |
| 2001/0045914 A1 | | 11/2001 | Bunker |
| 2001/0055298 A1 | | 12/2001 | Baker et al. |
| 2002/0015397 A1 | | 2/2002 | Hughes et al. |
| 2002/0015402 A1 | | 2/2002 | Hughes et al. |
| 2002/0018455 A1 | | 2/2002 | Yokoyama |
| 2002/0018456 A1 | | 2/2002 | Kakemizu et al. |
| 2002/0032799 A1 | * | 3/2002 | Wiedeman et al. ......... 709/245 |
| 2002/0152303 A1 | * | 10/2002 | Dispensa ................... 709/224 |

* cited by examiner

WIRELESS INTERNET ACCESS SYSTEM

BACKGROUND OF THE INVENTION

1. Field of the Invention

The present invention relates to computer networking, and more particularly to providing high speed network access at a customer premise or wireless device including cellular or Internet applications.

2. Description of the Related Art

Conventional telecommunications networks adapted for data communication providing high speed Internet access and the like facilitate network access with network nodes employing routers for directing data traffic between a customer premise modem. The advantage of the resulting mesh network structure of the conventional network that deploys routers and modems achieves substantial accessibility through redundancy by allowing each customer to route communications through the modem equipment associated with other customer premises. In the mesh network model, the redundancy achieved comes at considerable expense and also increases the latency across the network substantially. Some Internet service providers employed an approach where a tower feeds one customer premise, and then the other customers use multi-hop Internet protocol (IP) to connect via the first customer premise to provide high speed Internet access to a residential or small business customer community. However, this approach has proved to be problematic and inefficient because of the breakdown in accessibility that occurs when modems are powered down at customer premise or when customers cancel within the multi-hop IP connection, and substantial network configuration considerations are required to maintain network access in the overall system.

In the wireless Internet access environment in particular, having routing involved in a mesh network that accommodates for roaming of mobile devices requires announcements across the meshed network each time a new customer signs onto the wireless network to maintain security. Wireless modems with routers also require IP routing between each wireless modem. Accordingly, controlling and securing wireless networks employing routers in place for a meshed network structure results in substantial complexity and expense.

Moreover, in a meshed network, the data communications may tend to hop around the network before arriving at a gateway so as to increase the latency associated with the information communicated. This creates unwanted traffic on the wireless network. In addition, bandwidth management becomes a major issue, inasmuch as the service provider will have difficulty controlling the direction of all of the traffic. It would be desirable therefore to provide for high speed network access regardless of customer premise location within a community with decreased latency and expenditure.

Essentially, Internet users are presently presented with two options for access, i.e., that of a dial up account or broadband Internet service. The typical dial up account provides services for customers with speeds up to 56 Kbps. On the other hand, broadband service, which often costs at least twice as much as a dial up account, provides speeds from 384 Kbps to 5144 Kbps. In addition, most users also provide a second telephone line at the customer premise with their dial up service, which also increases the cost to the customer. There is also an install time typically associated with broadband service of up to several weeks, where available. Increasingly, business customers have also attempted to decrease their network communication cost by replacing communication lines with a virtual private network (VPN) via the Internet with reinforced security provisions for commercial transactions. It would be further desirable therefore to provide network access which allows for fast and inexpensive deployment by bypassing the public switch telephone network.

Currently, wireless Internet access is delivered from a tower, normally situated from an elevated location directly to the customer premise such that a direct line of sight is provided to the customer within several miles. These solutions are attendant with several problems associated with radio wave propagation characteristics, bandwidth utilization, as well as deployment costs. If the customer premise is situated in a low spot and out of sight of the tower, for example, the customer may not be able to receive service. The towers also emit radio waves across large areas and thus tend to over utilize available frequency spectrum. Additionally, the cost associated with deploying each customer may range from several hundred to thousands of dollars and tens of thousands of dollars for the service provider per tower. Accordingly, it is further desired to provide a wireless Internet access system having multiple access points throughout a location in a community which allows the customer to connect to a local access point which tends to handle low spot issues and extends service area indefinitely. Where one tower currently serves a large area, hundreds of smaller access points may be deployed for much broader coverage area at overall reduced costs.

SUMMARY OF THE INVENTION

The present invention provides a wireless network access system in which the network is laid out in a tree fashion, where each access point feeds back to higher access points to provide high speed Internet access to residential and small business customers regardless of their location in a community while decreasing deployment time and cost. The system and method advantageously uses access points that relay information back to a main gateway which supplies network access from a T3 or other high speed Internet connection. This approach utilizes numerous access points throughout a community, such that each access point relays information from other access points providing deeper coverage than typically available with line of sight communications from towers.

The described system does not employ routers in all of the access points or in the customer premise wireless modems, and thereby speeds processing time and reduces network latency and costs associated with a mesh network employing routers. Removing the router from substantially all of the wireless modems also allows for roaming of mobile devices while maintaining security and speed. The described system creates a bridge, using a protocol operable at a lower level than TCP/IP which supports TCP/IP communication, from the customer all the way back to the gateway or to a router that is inserted into an upstream access point to provide redundancy and to segment the traffic. Each access point can relay information from one wireless modem to another. An access point and an upstream wireless modem serving as a relay point with a downstream wireless modem as an option at the relay point customer premise are provided as three devices that are connected, e.g., via an Ethernet connection in a described embodiment. In the future, all of these wireless modems could be manufactured into one unit.

Two aspects of the wireless network access system and method further ensure secure communications. First, any information that comes into the wireless side has to go out the wired side, i.e., toward the gateway. Secondly, the access points provide filtering, e.g., on a protocol operable at a lower level than TCP/IP and supports TCP/IP communication (such as, but not limited to, Ethernet, Frame Relay, ATM, etc.), such that communications is limited as between the downstream wireless modem(s) and the access point providing service to the customer such that only upstream and downstream communication directly with the gateway is provided, thus prohibiting direct communication between individual customer premise modems. Thus, there is a filter provided between customer premises.

Briefly summarized, the wireless network access system and method provides a multiplicity of access point devices, each being capable of relaying information from at least one of the other access point devices. The wireless network is provided as a tree structure wherein each access point feeds back to a higher access point of the multiplicity of access point devices. A multiplicity of customer premise wireless network devices are provided with a wireless modem for communication from the customer premise limited to a path all the way back to a main gateway upstream to the wired side of the network where the gateway provides a T3 or other high speed Internet connection. Each customer premise wireless network access device also includes a directional antenna connected to the wireless modem and an interface adapted for conveying bidirectional data signals via the customer premise to the wireless modem. The wireless modem, in an environmental enclosure, and the directional antenna are locatable outside the customer premise for communication with an upstream network access device. The upstream network access device may include an omni-directional antenna for downstream communications.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENTS

Figure 1:
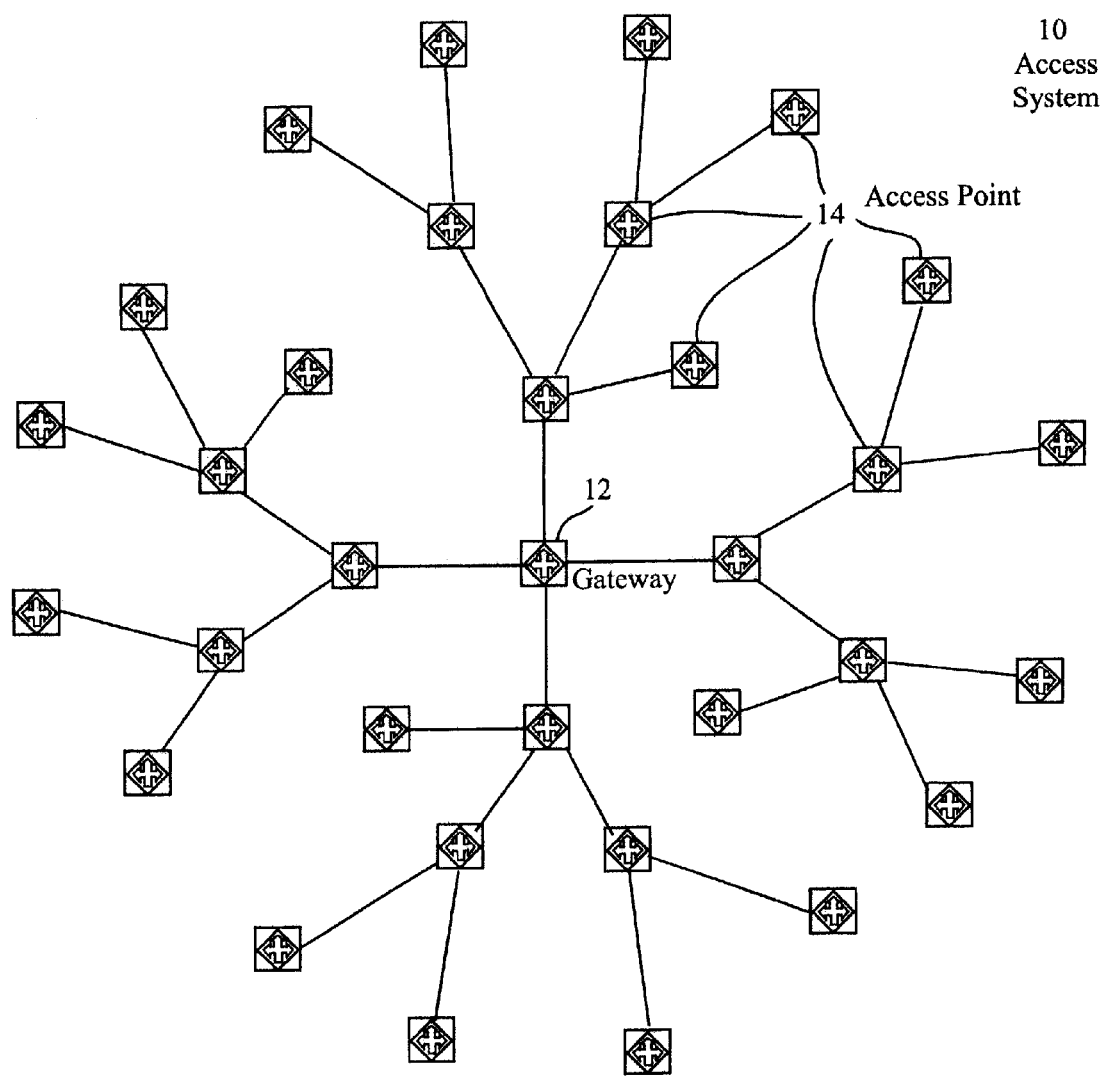
FIG. 1 is a diagram representing a tree network structure having a main gateway in the center of the diagram with network branches going in four different directions.

Turning now to the figures and particularly FIG. 1, an embodiment of the wireless Internet access system 10 is represented as a tree network structure having a central main gateway 12 with network branches going in four different directions from the gateway 12. FIG. 1 is a high level network diagram only representing access points, e.g., indicated by reference numeral 14. It should be appreciated from the diagram that each of the numerous access points 14 comprise access point devices in communication with customer modem devices from which each access 14 point attempts to offload the network traffic to the closest access point 14 to the gateway 12 to decrease the overall network load. As discussed further below, the customer's wireless modem access device 16 (shown in FIG. 2) is not shown in the diagram of FIG. 1. In the system 10, each of the multiplicity of access points 14 may be utilized from one or more embodiments of relay points having an upstream wireless modem, e.g., device 17, and further including an access point device, e.g., access point device 30 which has a wireless modem 34 shown in FIG. 3, as discussed further below. Each access point 14 is thus capable of relaying information from at least one of the other access points 14. With the wireless network of system 10 being provided as a tree structure, each access point 14 feeds back to a higher access point of the multiplicity of access points 14.

Figure 2:
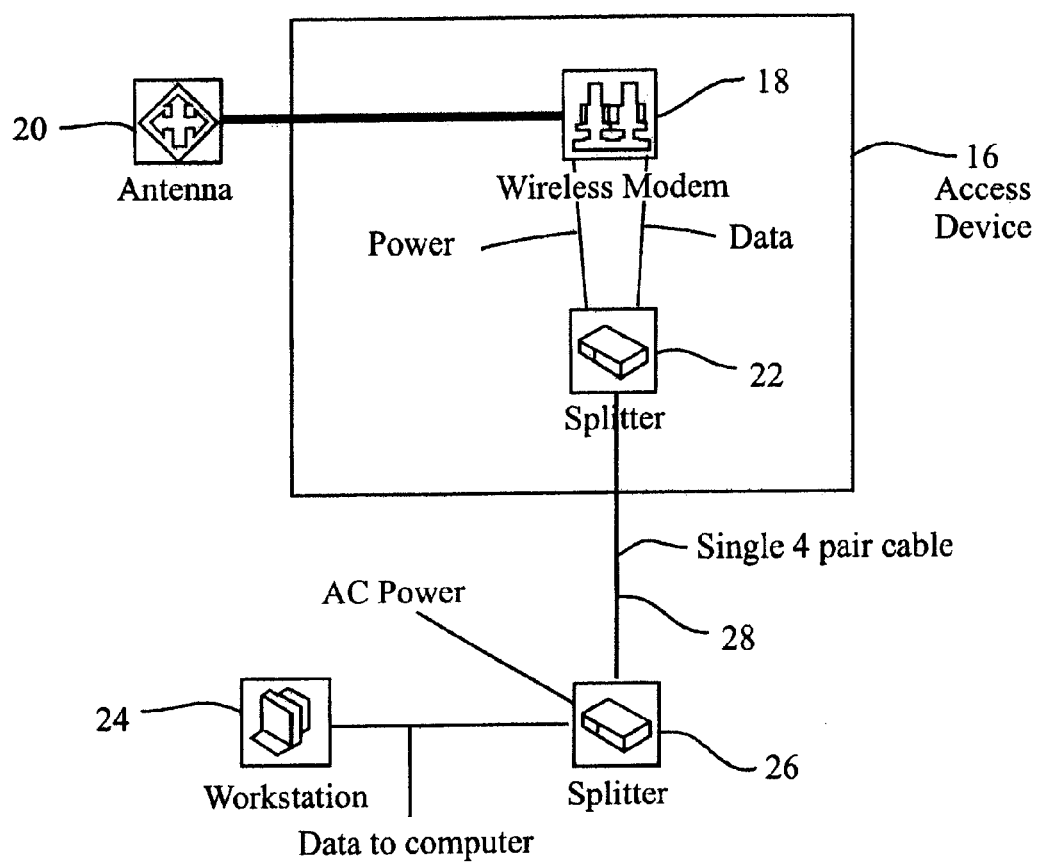
FIG. 2 shows the customer's wireless modem access device in accordance with the present invention.

With the provision of the multiplicity of access points 14 in the tree structure of the network system 10, the method further provides a multiplicity of customer premise wireless network access devices 16 having a wireless modem 18, a directional antenna 20, and an interface adapted for conveying bidirectional data signals via the customer premise wireless modem associated with a workstation 24 located at the customer premise. In FIG. 2, the interface 22 is provided as a splitter in communication with a second splitter 26 interface at the customer premise via a single four-pair cable 28. The customer premise wireless network access device 16 is provided in an environmental housing which provides a watertight enclosure for location on the roof, side of house, or other location that has access to the access point 14 of the customer premise. The wireless modem 18 within the enclosure and the directional antenna 20 on the customer premise allows for location of the wireless modem 18 within a couple feet from the directional antenna 20. The splitter 22 is inserted with the wireless modem 18 to join both power for the wireless modem 18 and data on the same cable 28, which is routed down into the customer computer location to the workstation 24 via the splitter 26. The splitter 26 separates the power and data signals, and the splitter 26 will have two cables, one plugged into a AC/DC power source and the other cable being plugged into the workstation 24 to provide data to the customer's computer.

The bidirectional data signals are conveyed via the customer premise wireless modem 18 of the wireless network access device 16 to at least one of the multiplicity of access points 14, specifically to wireless modem 30 and then passed via a protocol operable at a lower level than TCP/IP which supports TCP/IP communication to wireless modem 17, as an uplink to the main gateway 12 for supplying a high speed Internet connection to the wireless network system 10. Accordingly, the method employed provides for relaying information from one of the customer premise wireless network access devices 16 through at least one of the multiplicity of access points 14 to establish a bridge from the customer premise to the main gateway 12, specifically to router 76 or to an upstream router 88 discussed in connection with FIG. 6, and then on to the main gateway 12. The wireless network access method thus establishes a virtual private network (VPN) service across the wireless network system 10 for security from the customer's workstation 24 or 40 to the VPN concentrator 80.

It will be appreciated that the system 10 uses the access points 14 to relay information back and forth from the main gateway 12 that supplies Internet access to the wireless network from the wired side of a T3 or other high speed Internet connection in communication with the gateway 12. The customer connects to one of the upstream access points 14 via the wireless network access device 16 located on the roof, or other location to provide service, of the customer premise. The system 10 is designed to have numerous access points throughout a community, each access point 14 relaying information from other access points 14 providing deeper coverage than generally available with towers. Thus, the wireless Internet access system 10 is designed to provide high speed Internet access to residential and small business customer communities regardless of their location, while decreasing deployment time and costs. The access points 14 are strategically located on the roofs, or other location to provide service, of businesses or homes, feeding customers wireless modems 16 in the area via wireless modem 30, the local customer premise workstation 40 via Ethernet, and the next access point(s) 14 in line via wireless modem 30 or wireless modem(s) 52. With the network system 10 being laid out in a tree fashion, where each access point 14 feeds back to a higher access point 14, a bridge is created from the customer premise all the way back to the router 76 or to an upstream router 88 discussed in connection with FIG. 6, and then on to the main gateway. There are filters in place on a protocol operable at a lower level than TCP/IP which supports TCP/IP communication, that only enable communications from each customer to the gateway 12 or to upstream routers, which thereby force the customer to talk via the gateway or to other routers, and thus prohibit communications from customers directly to other customers. The filters thereby prohibit customers from talking directly to other customers. Once the customer authenticates via the VPN, each customer will be able to communicate to each other via the VPN concentrator 80. A software filter will need to be placed on router 76 that only allows packets with the destination address of the VPN concentrators 80 and 84 to be passed to the wired side. An additional software filter will need to be placed on router 76 that only allows packets with the source address of the VPN concentrators 80 and 84 to be passed to the wireless side. A filter will also need to be added to routers 88 that only allows packets with the source address of the VPN concentrators to be passed to the downstream network including redundant modem link 90.

As discussed further in connection with the head end office 70 in FIG. 6 below, anything that comes in on the wireless side has to go out on the wired side, e.g., towards a head end providing high speed access such as the gateway 12, router 76, or VPN concentrator 80. Moreover, the relay points of access points 14 for communicating information via the access point devices discussed further below provide the filtering on a protocol operable at a lower level than TCP/IP and supports TCP/IP communication, such that communications is limited as between downstream customer premise and the access points 14 providing service to the community such that only upstream communication directly to the gateway 12 is provided. There are no routers in the access points 14 or in the customer premise wireless network access devices 16 which thereby speeds processing time and reduces overall costs. If routers were provided in such access devices, a mesh network would result which provides greater redundancy by allowing each customer to route through one another. However, if this were the case, the cost would break the model and the latency across the network could be doubled. Removing the router from each modem also allows for roaming of mobile devices while maintaining security and speed, because having routing involved in roaming requires announcements across the network each time a new subscriber signs on to the network. While routers are not placed in all wireless modems, a small and limited number of access points, compared to the overall network size, will have a router inserted in them. This will create network segments to manage the size of the ARP tables for downstream access points and customers and to provide redundancy for access points downstream of the routers by re-routing traffic to the other tree segment in the event of a network outage or heavy traffic load. These routers do not utilize multi-hop IP, but instead use a routing protocol such as RIP or OSPF that would be implemented between the routers and the router 76. The network can have routers in this configuration at various points along the tree network where network segmenting and/or redundancy is required.

All customers, whether roaming or fixed, would receive a non-routable (not able to route on the Internet) IP address to connect to router 76 and then to the VPN concentrator 80 or 84. The routers 88, where employed, router 76, or a separate server, may also be provided as dynamic host configuration protocol (DHCP) servers to assign IP addresses or insert static IP addresses for the workstations at the customer premise. These routers may be DHCP servers or may use DHCP relaying from another DHCP server. Customers would connect to the VPN concentrator using the non-routable IP address, which would query the Radius server for proper logon information to authenticate. Once authenticated, the customer would receive a routable IP address to gain access to the Internet. This is achieved with the VPN concentrator 80 maintaining the VPN service across, e.g., an Ethernet bridge or other like layer 2 protocol for security from the customer premise to the other side of the gateway 12.

Figure 3:
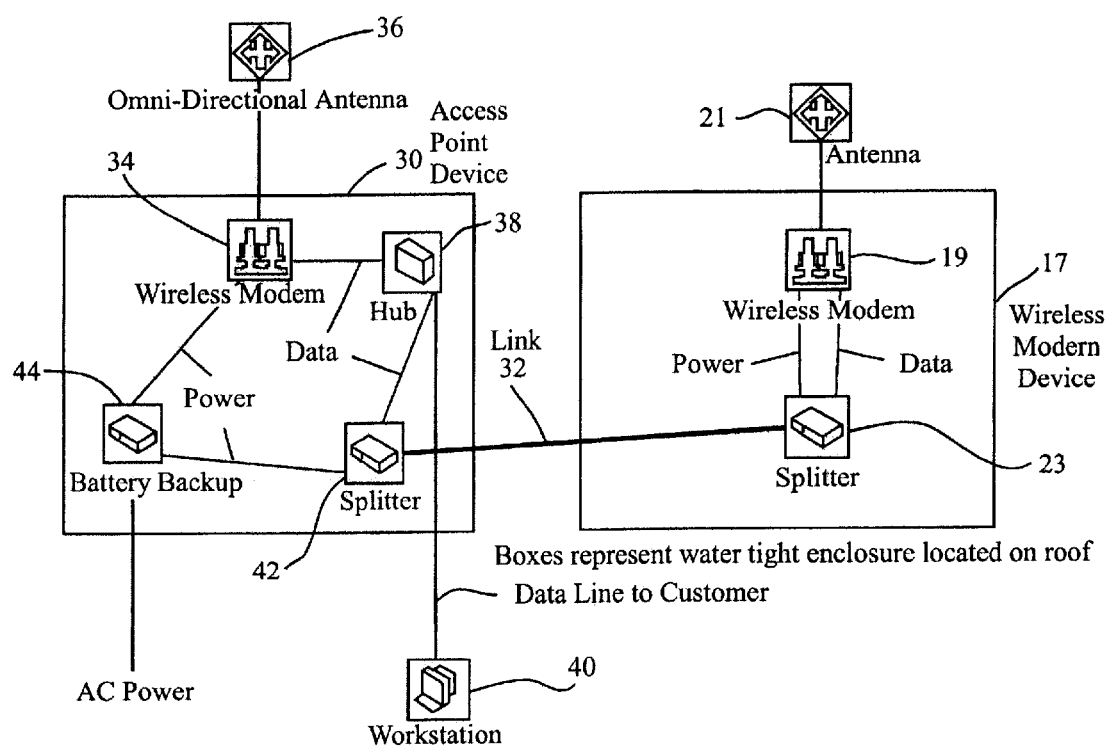
FIG. 3 shows the access point configuration utilizing a customer premise wireless modem and a second wireless modem having an omni-directional antenna for communication with downstream customer premise access devices of FIG. 2 or downstream access points.

With reference to FIG. 3, a relay point is illustrated including the wireless access point device 30 shown for relaying information from wireless modems to wireless modem 17 via a protocol operable at a lower level than TCP/IP and supports TCP/IP communication. The access point 30 configuration utilizes essentially the same hardware configuration as that of the customer premise wireless network access device 17 provided here as an uplink wireless modem, i.e., a first wireless modem 19, a splitter, or interface device 23 with an environmental enclosure and a directional antenna 21. In the access point device 30 shown in FIG. 3, a communication link 32 to another environmental enclosure housing and a second wireless modem 34 is in communication with an omni-directional antenna 36. The omni-directional antenna 36 facilitates relay communications to downlink access points and to customers. The second wireless modem 34 and workstation 40 can connect to the first wireless modem 19 via a hub 38. In addition, the hub 38 is connected to a second splitter 42 which communicates via the first splitter 23 over the communication link 32. Accordingly, the hub 38 allows the workstation 40 and wireless modem 34 to communicate to the uplink access points via directional antenna 21 through splitter 42 and 23 for transmission using the first modem 19. Alternately, the hub 38 connects to the downlink via the second modem 34 and the omni-directional antenna 36 as discussed above. Power is provided with a battery backup 44 for powering both the first wireless modem 19 and the second wireless modem 34.

It will be appreciated from FIG. 3 that the wireless access device 30 is connected to the omni-directional antenna 36 which resides outside the environmental enclosure for facilitating the downlink broadcast which comprise low power transmission broadcast capabilities allowing for frequency reuse within a relatively small operating area. All wireless modems have the function to adjust the output power to facilitate short and long range connections. Customer premise modems 18 can have the output power turned down so as to not overwhelm the relay point and to help throttle upload throughput. The wireless access point device 30 and the upstream wireless network access device 17 are connected via, e.g., an Ethernet connection or the like to provide a protocol operable to support TCP/IP communication, which typically allows for data transfer on the order of 100 Mbps. Most customers will connect to the customer premise wireless modem via Ethernet, i.e., the customer premise wireless modem 16, or a universal serial bus (USB) connection to the device 16 (FIG. 2) will be used. The customers that connect to the customer premise wireless modem 16 will not connect via Ethernet to the relay point of FIG. 3. Some customers that utilize an access point via the relay points of FIG. 3 will have two or more modems on their houses, i.e., device 30 which includes the access point and the other modem device 17, which is the upstream wireless modem, and that is connected via Ethernet to the customer's computer, i.e., workstation 40.

In the described embodiment, the wireless modems include a SMC Networks 11 Mbps wireless access port, manufactured by Accton Technology Corporation, Model No. SMC2655W, of SMC Networks, Irvine, Calif., which is used conventionally for both business and home users with an operating range of approximately 1800 feet. The access points 14 employing the second wireless modem 34 discussed herein provides compatibility with IEEE 802.3, and 802.11a or 802.11b, or 802.11g communications protocols in the 2.4 or 5 GHz frequency band with direct sequence spread spectrum (DSSS) encoding and 64 or 128 bit encryption. As the network grows, the upstream wireless modems 17 and downstream wireless modems 52 could be replaced with 802.11a technology whose frequency band is in the 5 GHz range, while the access points 30 and the customer wireless modems 16 would continue to utilize 802.11b technology at 2.4 GHz frequency range. This configuration would free up frequency substantially. The SMC 11 Mpbs wireless access port supports media access control (MAC) address filtering, power over Ethernet, and signaling network management protocol (SNMP) management utilities. As discussed, the access points allow for the creation of a bridge from the router 76 or to an upstream router discussed in connection with FIG. 6 and then on to the main gateway to the customer premise. In some cases, an Internet protocol (IP) router/filter may be inserted into the access points 14 to segregate and filter unwanted MAC addresses and IP addresses on the network system 10. Customers connecting to the system 10 via Ethernet, USB, etc., with the first wireless modem 18 or 19, or via Ethernet as in workstation 40, receive an IP address and a login name and password. The customer would also utilize virtual private network (VPN) software for point-to-point communications via workstation 24 or 40 which may be equipped with a firewall/router that has VPN client support. Each wireless modem 16, 17, 30, and 52 may encrypt the information to the other wireless modems and to the customer utilizing wired equivalent protection (WEP) in either the 64 or 128 bit encryption (standard security), but the system does not require this encryption to be activated to function correctly and to remain secure. In addition, the system 10 can utilize the VPN which can encrypt the information from the customer's workstation 24 or 40 directly to a VPN concentrator located at the gateway 12, ensuring a higher level of security. For bandwidth management, a packet shaper would be placed between the router 76 and the VPN concentrator 80 of the Ethernet backbone to allow for bandwidth management on a customer or network wide level. As the network grows, the packet shaper would be moved between router 76 and gateway access point 72. There would be one optional packet shaper 92 for each gateway access point 72 deployed. This would also allow the network traffic to be controlled dynamically by allowing for bandwidth increases and decreases to accommodate customers depending on current network loading. There could also be a bandwidth throttle on wireless modem 34 that would place a limit on the maximum amount of bandwidth one customer could transmit or receive, which would prevent a denial of service attack (ping flood). These devices represent what the main gateway system would look like in each city. More detail is provided below:

1. Internet Connection (T1, T3, etc.);
2. Router (terminates Internet Connection);
3. VPN Concentrator;
4. Packet Shaper;
5. Wireless Gateway (could be either device 30 or device 52); in FIG. 1, there are four (4) devices 52 inside of gateway 12 connecting to other relay points;
6. Relay Points;
7. Routers (providing redundancy and network segmentation);
8. Relay Points;
9. Routers (providing redundancy and network segmentation);
10. Relay Points.

This configuration would be the head end system for each local community. There could be many head end locations in a city or town each providing service to a specific area. Another option would be to provide the VPN concentrator to include bandwidth management in its configuration and remove the packet shaper from the network.

Figure 4:
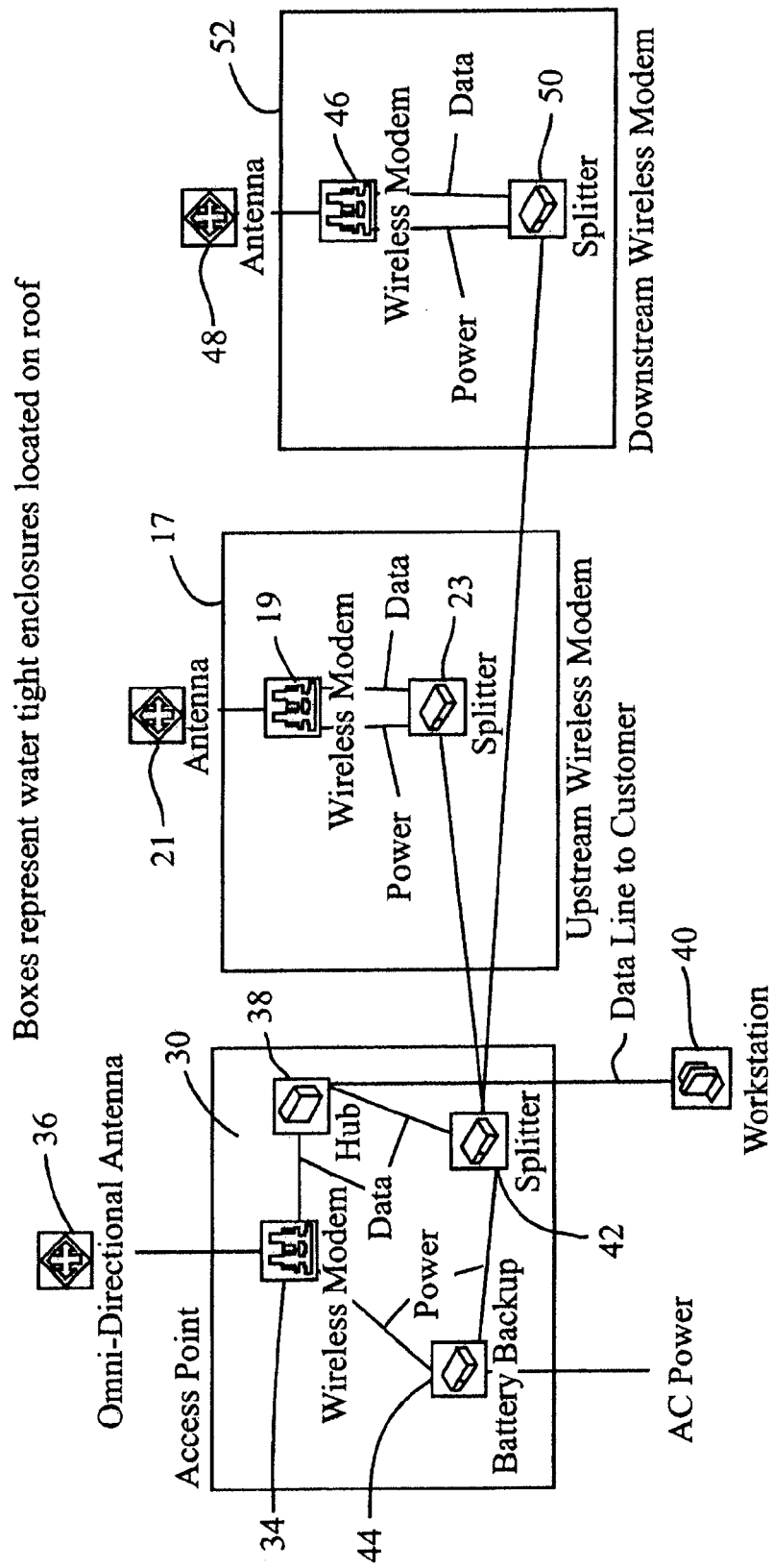
FIG. 4 shows an access point configuration having a third wireless modem provided as a downlink wireless modem employing a directional antenna in areas where cross talk is a problem or where extra throughput is required through the use of additional downlink wireless modems.

To obtain greater throughput and/or greater distance, a third wireless modem 46 may be added to feed the downstream wireless access points as shown in FIG. 4. The access point configurations may be provided as separate units or integrated as discussed in connection with the alternate embodiment of FIG. 7 below. In FIG. 4, the access point configuration is shown having the third wireless modem 46 provided as a downlink wireless modem employing a directional antenna 48 in areas where crosstalk is a problem or where extra throughput is required through the use of additional downlink wireless modems that would feed downstream access points via the directional antenna 48, rather than the omni-directional antenna 36. To further enhance this feature, both directional antennas (antenna 48 and antenna 21) from the upstream and downstream access points (see access points 14 in FIG. 1) could be mounted such that horizontal polarization is utilized to help eliminate interference from other devices on the same frequency. To this end, vertical, horizontal, circular, and different angles from 90 degrees orientation of antenna 48, e.g., 45 degrees and horizontal omni-directional antenna communications, may be used to facilitate downlink communications with additional modems as that provided by the third modem 46. Accordingly, additional downlink modems may be provided to accommodate relay points in different physical directions, e.g., there may be as many as five or six wireless modems in some relay points. To further enhance frequency utilization, a metal shield could be deployed on the omni-directional or directional antennas to block cross talk from other access points. In the access point device of FIG. 4, the third wireless modem 46 communicates via a splitter 50 to the splitter 42 of access device 30. An enclosure 52 may be provided as a separate environmental enclosure from that of the uplink wireless modem device 16 and the access device 30. However, as shown in connection with FIG. 5 discussed below, the first, second, and third modems of the embodiment of FIG. 4 may be integrated into a single enclosure. The first, second, and third modems of the embodiment of FIG. 4, indicated by reference numerals 18 or 19, 34, and 46, respectively, are represented as wireless modems A, B, and C, respectively, in connection with FIG. 5.

Traditionally, wireless modems with antennas cost at least several hundred dollars because of the range from access point to wireless modem required and the manufacturing cost. The solution of the described embodiment however is able to drive down the cost for the customer equipment to the $100 to $150 price range by utilizing wireless modems that requires less range and by installing the antennas and the wireless modems close together, which reduces the length of expensive RF low loss cable. In addition, it may be possible to integrate the splitter functions within the wireless modem itself. Thus, from a recurring basis, there is a large reduction in cost since the wireless modem bypasses the public switch telephone network (PSTN) and cable companies in order to deploy service at a substantially reduced price point. In addition, frequency utilization is kept to a minimum because the uplink and downlink antennas employed are not powerful enough to broadcast over an entire metropolitan area, therefore allowing for frequency reuse within relatively small operating areas. Advantageously, the antennas being provided at lower elevation than the conventional tower solution also allows for buildings and trees to absorb much of the crosstalk that would otherwise be attendant with such applications. Also, each wireless modem in an access point 14 will be on different channels. For example, the upstream wireless modem 19 may utilize channel 1, while the access point wireless modem 34 may use channel 8, and the downstream wireless modem 46 may utilize channel 4. In addition to different channels, each wireless modem can utilize different modulation types and data rates. For example, wireless modem 34 might utilize a different modulation type and data rate compared to wireless modem 19 or 46.

Figure 5:
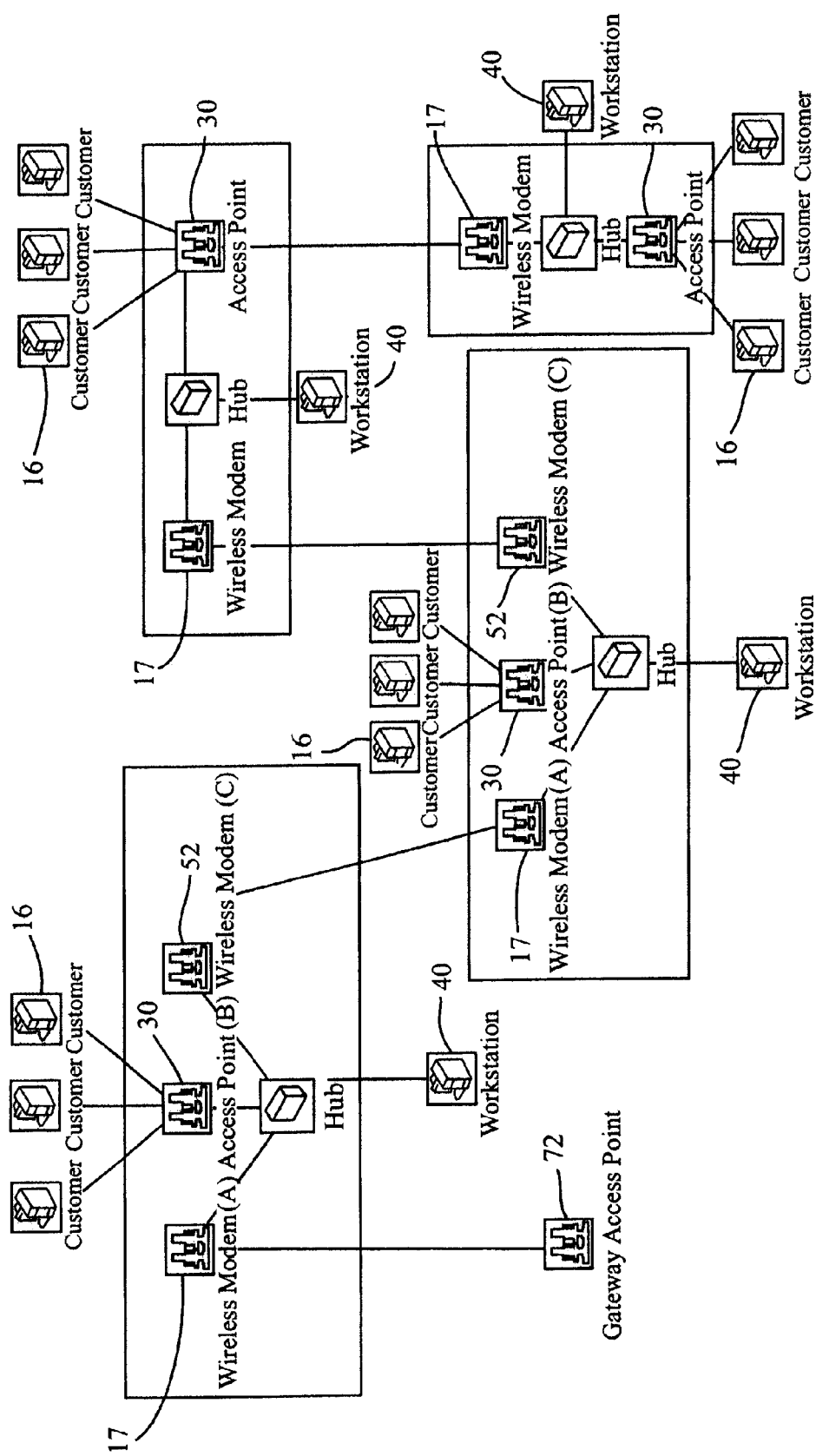
FIG. 5 shows a wireless Internet access system in accordance with the invention employing both the access point configurations of FIG. 3 and FIG. 4 serving as relay points, with filtering provided on a protocol operable at a lower level than TCP/IP which supports TCP/IP communication, such that, e.g., the downlink wireless modem, i.e., Modem C and workstation 40, are prohibited from talking to each other and with the wireless modem providing service to the customer premise, i.e., Modem B.

FIG. 5 shows a wireless Internet access embodiment employing both the access point configurations of FIG. 3 and FIG. 4, two-modem and three-modem configurations, respectively, serving as relay points with filtering provided on the protocol operable at a lower level than TCP/IP which also supports TCP/IP communication, such that, e.g., the downlink wireless modem, i.e., Modem C, is prohibited from talking with the wireless modem providing service to the customer premise modem 16, i.e., Modem B and with workstation 40.

Figure 6:
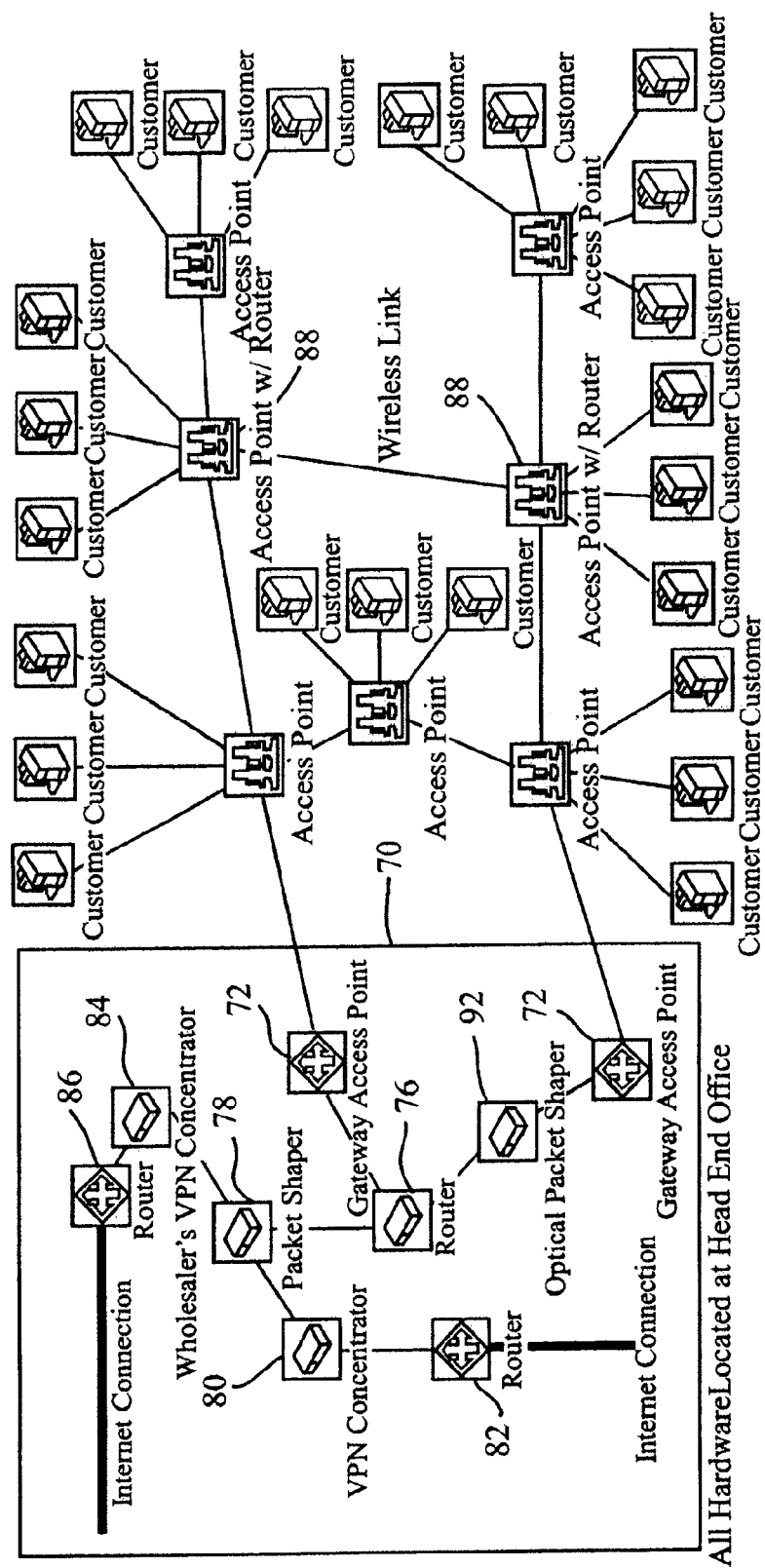
FIG. 6 illustrates a potential network configuration allowing customers to connect, and a wholesaler's VPN concentrator to allow for wholesaling of the network.

The embodiment of FIG. 6 illustrates a potential network configuration facilitating VPN concentrators at the gateway, allowing customers to connect with a wholesaler's VPN concentrator to receive service. The gateway configuration shown uses a packet shaper 78 for bandwidth management, and a VPN concentrator 80 allowing customers to connect. The wholesaler's VPN concentrator 84 allows for wholesaling of the network. FIG. 6 illustrates the system 10 in which the wired side of the network is provided opposite gateway access points through hardware located at a head end office 70 where gateway access points 72 are facilitated through router 76 which provides network segmentation between each gateway access point 72 and RIP or OSPF routing with routers 88. Herein, the router 76 is not provided for multi-hop IP but rather provides redundancy and network segmentation for the off-premise downstream network of the system 10. As shown, the wired side, Internet connection is connected to a router 82 from which VPN concentrator 80 can encrypt the information and packet shaper 78 can manage bandwidth from the wireless network system 10. To enable roaming, the extended service set identification (ESSID) can be set the same across all of the access points for use by users roaming among multiple access points 14. Wireless customers and wireless access points within the extended service set therefore must be configured with the same ESSID. Encryption can be turned off on the wireless modems that talk directly to the customer's wireless modem. Since the wireless access system allows customers to only speak with the gateway, the network can be accessed by anyone (non-authenticated) to try to establish a VPN connection, while still maintaining a secure network. The configuration would also allow the service provider to remove the security features that prohibit roaming while still maintaining a secure environment. Once the customer authenticates via the VPN concentrator 80, each customer will be able to communicate to each other via the VPN concentrator 80. Where there are three wireless modems in the relay point, a filter on the protocol operable at a lower level than TCP/IP and supports TCP/IP communication, as discussed above, is used such that the downlink wireless modem, Modem C, is prohibited from talking to the wireless modem providing service to the customer, i.e., Modem B. In both two modem and three modem relay point types, as defined in FIG. 3 and FIG. 4, workstation 40 is only allowed to talk to Modem A.

Accordingly, for roaming customers, there would be provided software on the client computer that looks for the correct ESSID, attempts to establish a VPN connection, and if more than one access point is identified with the same ESSID, the client computer would rotate through until the correct VPN connection is established. This ensures security by preventing hackers from placing wireless modems with the same ESSID where customers may try to connect, only to reach a dead end. Roaming customers could use the wireless modem 16, a USB modem, or a PCMCIA modem each with a standard antenna or with a custom directional or omni-directional antenna suited to this application.

For wholesaling, wholesalers could place their own VPN concentrators 84 at the gateway and customers could connect to the wholesaler's VPN to receive service. An IP Internet address layout system may be designed such that no two customers or no two VPN concentrators would be provided with the same IP address. This would also allow for roaming between carriers as well as different cities. As an option to wholesalers, the VPN concentrator 80 can authenticate via Radius server to Radius server instead of placing a wholesalers VPN concentrator 84 at the gateway 12. Customers from different networks, i.e., different service providers, will thus be able to roam across all networks using the Radius roaming technology by adding the domain name to the end of the login name, therefore telling the local Radius server which remote Radius server to use for forwarding requests. This gives each service provider the ability to maintain their own accounts locally while still allowing the customer to roam across many different service provider networks. From a billing perspective, when a customer roams, the VPN concentrator 82 will create a billing record with the roaming service provider via Radius accounting. It will be the roaming service provider's responsibility to obtain payment from the customer's home service provider.

Figure 7:
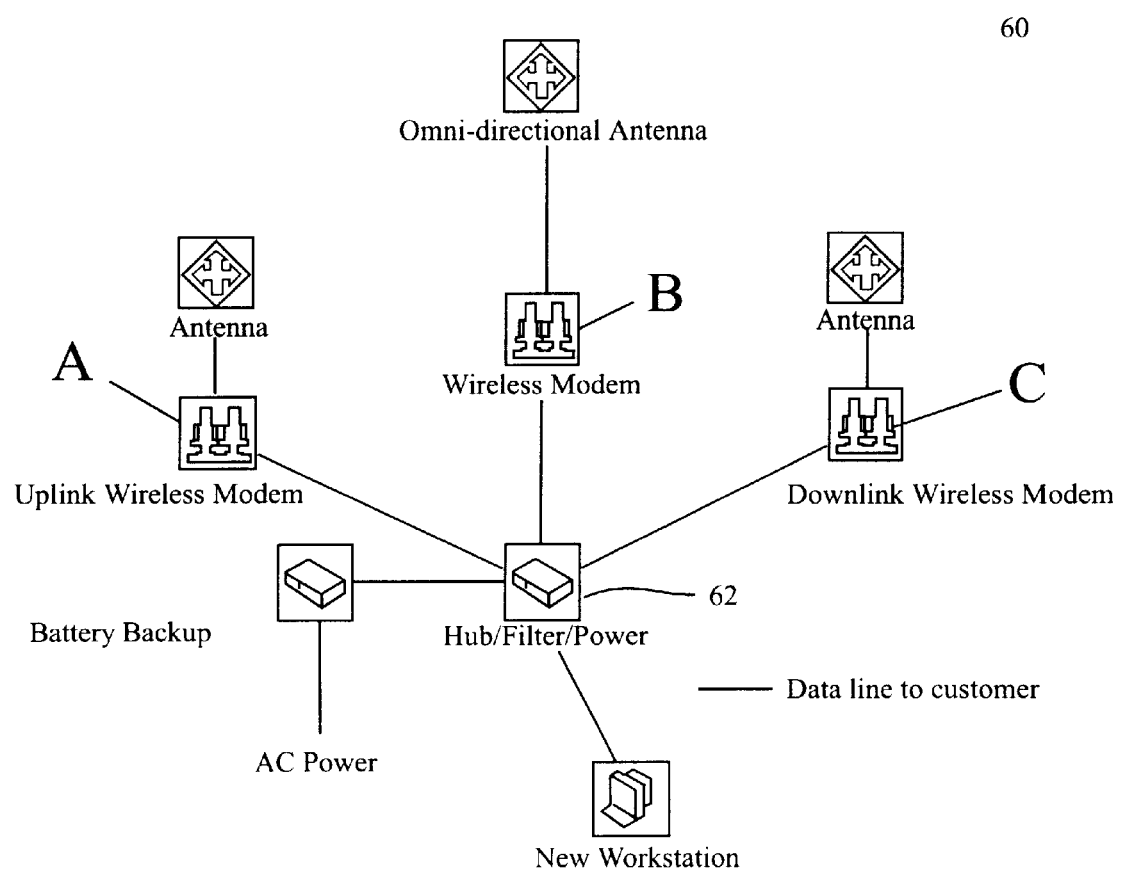
FIG. 7 shows an alternate embodiment wireless network access device employing a combined hub/splitter to broadcast to directly connected customers and to feed downstream access points in accordance with the present invention.

With reference to FIG. 7, an alternate embodiment wireless network access device 60 is shown employing a combined hub/splitter 62 to broadcast to directly connected customers and to feed downstream access points, as discussed above. The hub/splitter is provided with a six-socket RJ48 patch panel with pins 4 and 5 bridged together across all sockets and being connected to plus power, pins 7 and 8 bridged together across all sockets and being connected to minus power, and bridging pins 1 and 2 of socket 1 to pins 3 and 6 of the remaining sockets, and bridging pins 3 and 6 of socket 1 to pins 1 and 2 of the remaining sockets, in order to accommodate the filtering of wireless modems A, B, C, and workstation 40. Upstream wireless modem 17 would connect into socket 1 via an Ethernet cable. The hub/splitter is currently not provided with an intelligent information processing capability, but merely provides an interface for interconnecting each wireless modem and the customer premise workstation at the access point. The hub/splitter could have switching capability.

Figure 8:
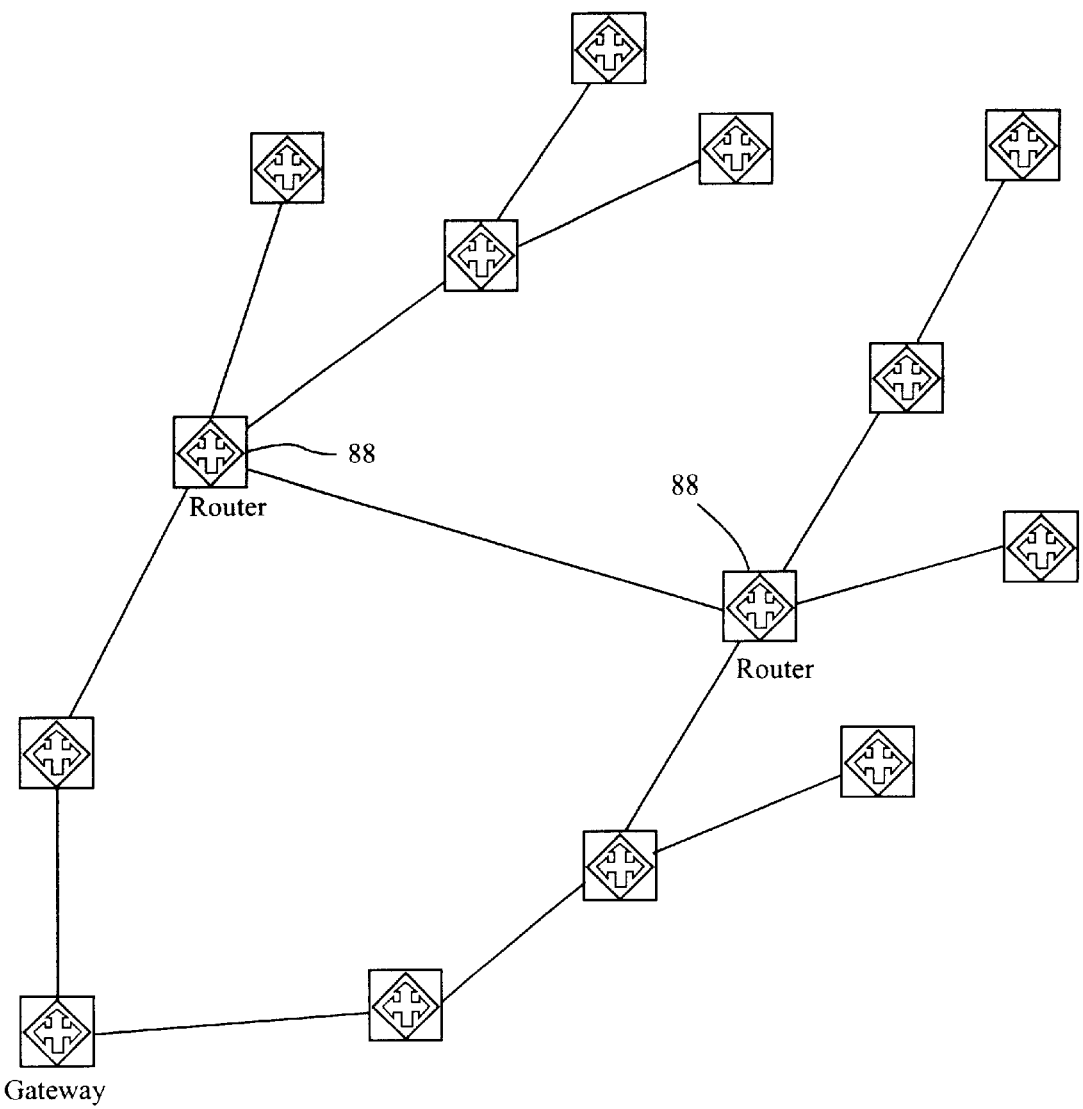
FIG. 8 illustrates a potential network configuration which routers are placed in two of the access points creating network segments (IP subnets) to manage the size of the address resolution protocol (ARP) tables for downstream access points and to provide redundancy for access points downstream of the routers by re-routing traffic to the other tree segment in the event of a network outage or heavy traffic load. Each new network segment will have a new IP subnet. A routing protocol such as routing information protocol (RIP) or open shortest path first (OSPF) (link-state routing algorithm) would be implemented between the routers and the gateway to route these IP subnets. The network can have many routers in this configuration at various points along the tree network where network segmenting and/or redundancy is required.
Figure 9:
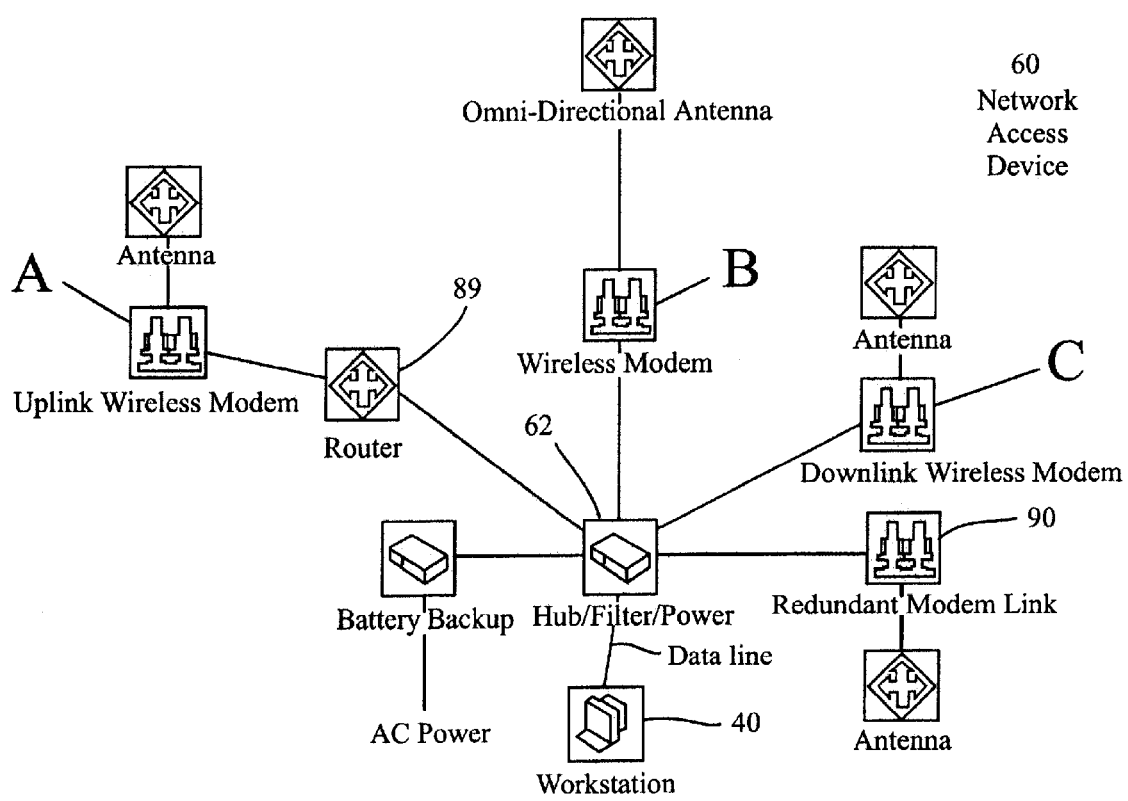
FIG. 9 illustrates the configuration of an access point with a router inside, as demonstrated in FIG. 8.

With reference to FIGS. 8 and 9, a potential network configuration is illustrated in which routers are placed in at least two of the access points creating network segments comprising IP subnets to manage the size of the address resolution protocol (ARP) tables downstream of the routers and for redundancy by using the routers to reroute traffic to the other tree segments in the event of a network outage or heavy traffic load. With reference to FIG. 9 in particular, router 89 can communicate with wireless modem B, wireless modem C, workstation 40, and redundant modem link 90. However, wireless modem B, wireless modem C, workstation 40, and redundant modem link 90 cannot communicate with each other for the security purposes discussed above facilitated through the use of filtering at a protocol operable at a lower level than TCP/IP which also supports TCP/IP communication, to prohibit such direct communications between the wireless modems.

Accordingly, each new network segment will have a new IP subnet. A routing protocol such as routing information protocol (RIP) or open shortest path first (OSPF), a link-state routing algorithm, would be implemented between the routers and the gateway to route information to these IP subnets. The network may have several routers in the described configuration at various points along the tree wherein network segmenting and/or redundancy is desired to facilitate robust operation in the event of substantial outages or heavy traffic.

Regarding FIG. 9, the desired redundancy and filtering is further accomplished through the use of wireless modem A which can communicate with the router 89 via a wired connection. The wireless modem A can communicate with wireless modem B, wireless modem C, workstation 40, and the redundant modem link 90 through the router 89. As discussed above, this creates a filter to ensure that the customers may only communicate with the wired side of the gateway 12 and not directly to one another. Accordingly, the described network configuration employing the tree network and the routers for segmenting or redundancy facilitates the desired routing protocol while maintaining robust network operation.

While there have been illustrated and described particular embodiments of the wireless Internet access system, it will be appreciated that numerous changes and modifications will occur to those skilled in the art, and it is intended therefore that the appended claims cover all such changes and modifications which fall within the true spirit and scope of the present invention.

What is claimed is:

1. A wireless network access device and relay point customer premise, comprising:

a first wireless modem;

a directional antenna connected to said first wireless modem;

a first interface adapted for conveying bidirectional data signals and power via a customer premise to said first wireless modem;

a second wireless modem;

an omni-directional antenna connected to said second wireless modem;

and a second interface for receiving power and at least a portion of the bidirectional data signals and for switching data from said second wireless modem to said first wireless modem to be communicated from said first wireless modem; and wherein one or more of said first wireless modem, said second wireless modem, a connection to said directional antenna, a connection to said omni-directional antenna, said first interface, or said second interface, are environmentally enclosed, and wherein said first and second wireless modems, said directional and omni-directional antennas, and said first and second interfaces are each located at a customer premise which also serves as a relay point of the wireless network.

2. A wireless network access device as recited in claim 1, wherein said interface comprises a first splitter adapted for conveying power and adapted for conveying bidirectional data signals via the customer premise.

3. A wireless network access device as recited in claim 2, comprising a transformer operable from the customer premise for converting alternating current (AC) power to direct current (DC) power for transmission via said first splitter conveying the power and bidirectional data signals.

4. A wireless network access device as recited in claim 2, wherein said first wireless modem comprises said first splitter for communication via said interface conveying power and bidirectional signals via the customer premise.

5. A wireless network access device as recited in claim 1, comprising a splitter receiving power and bidirectional data signals from a workstation at the customer premise.

6. A wireless network access device as recited in claim 5, comprising a single four (4) pair cable connecting said first splitter and second splitter.

7. A wireless network access device as recited in claim 1, wherein said second interface comprises:
   a splitter for receiving the power and bidirectional data signal; and
   a hub for switching data from said second wireless modem to said splitter.

8. A wireless network access device as recited in claim 1, further comprising a plurality of downlink wireless modem devices in communication with said second interface, each downlink wireless modem device comprising:
   a downlink wireless modem; and
   a downlink directional antenna connected to said downlink wireless modem for relaying information in the wireless network from downstream customer premises;
   wherein the second interface switches at least some of the relayed information to the first wireless modem.

9. A wireless network access device as recited in claim 8, wherein each said downlink directional antenna comprises at least one of vertical, horizontal, circular, or different angles of polarization utilized for communication with at least one downstream access point to reduce interference from other devices.

10. A wireless network access device as recited in claim 1, comprising a gateway supplying internet access to the wireless network from a T3 or other high-speed internet connection, said first wireless modem communicating with at least one other wireless network access device or said gateway serving as an upstream access point for establishing an Ethernet bridge from the customer premise to said gateway.

11. A wireless network access device as recited in claim 1, wherein said directional antenna and said omni-directional antenna each comprise low power transmission broadcast capabilities allowing for frequency reuse within a relatively small operating area.

12. A wireless network access device, comprising:
   a first wireless modem;
   a directional antenna connected to said wireless modem;
   an interface adapted for conveying bidirectional data signals via a customer premise to said wireless modem;
   an environmental enclosure for housing said wireless modem, a connection to said directional antenna and said interface, said enclosure being locatable outside the customer premise;
   a second wireless modem;
   an omni-directional antenna connected to said second wireless modem;
   a second interface for receiving the power and bidirectional data signals and for switching data from said second wireless modem; and
   a gateway supplying internet access to the wireless network from a T3 or other high-speed internet connection, said first wireless modem communicating with at least one other wireless network access device or said gateway serving as a upstream access point for establishing an Ethernet bridge from the customer premise to said gateway;
   wherein said Ethernet bridge comprises one or more filters in place on the Ethernet level of the network such that each customer may only establish a communication path to said gateway, thereby prohibiting establishment of communication paths with other customers.

13. A wireless network access device as recited in claim 12, wherein said filters only allow information from customer premises to go onto the wired network via said gateway such that two or more customer premises workstation on the same access point are prohibited from establishing direct communication paths therebetween.

14. A wireless network access device, comprising:
   a first wireless modem;
   a directional antenna connected to said wireless modem;
   an interface adapted for conveying bidirectional data signals via customer premise to said wireless modem;
   an environmental enclosure for housing said wireless modem, a connection to said directional antenna and said interface, said enclosure being locatable outside the customer premise;
   wherein said interface comprises a first splitter adapted for conveying power and adapted for conveying bidirectional data signals via the customer premise;
   a second wireless modem;
   an omni-directional antenna connected to said second wireless modem;
   a second interface for receiving the power and bidirectional data signals and for switching data from said second wireless modem; and
   a gateway supplying internet access to the wireless network from a T3 or other high-speed internet connection, said first wireless modem communicating with at least one other wireless network access device or said gateway serving as an upstream access point for establishing an Ethernet bridge from the customer premise to said gateway;
   wherein said gateway comprises virtual private network (VPN) service across said Ethernet bridge for security from the customer premise to the other side of said gateway.

15. A wireless network access device as recited in claim 14, comprising a packet shaper to dynamically adjust connection speeds based upon network utilization to provide bandwidth management on a per customer basis.

16. A wireless network access device as recited in claim 14, wherein said Ethernet bridge comprises one or more filters in place on the Ethernet level of the network such that each customer may only establish a communication path to said gateway, thereby prohibiting establishment of communication paths with other customers.

17. A wireless network access device as recited in claim 14, further comprising a plurality of downlink wireless modem devices in communication with said second interface, each downlink wireless mode device comprising:
   a downlink wireless modem; and
   a downlink directional antenna connected to said downlink wireless modem for relaying information in the wireless network from downstream customer premises.

18. A wireless network access device and relay point customer premise, comprising:
   a first wireless modem;
   a first directional antenna connected to said first wireless modem for communication with at least one other wireless network access device serving as an upstream access point;

a second wireless modem;

an omni-directional antenna connected to said second wireless modem for downstream broadcast;

a first interface adapted for conveying bidirectional data signals with said first wireless modem;

a second interface for conveying bidirectional data signals with said first interface; and a hub or hub/splitter for switching bidirectional data signals from said second wireless modem to said second interface, and wherein said first and second wireless modems, said directional and omni-directional antennas, said first and second interfaces and said hub are each located at a customer premise which also serves as a relay point of the wireless network.

19. A wireless network access device as recited in claim 18, comprising:

a third wireless modem; and a second directional antenna connected to said second wireless modem for communication with at least one downstream access point.

20. A wireless network access device as recited in claim 19, wherein said second directional antenna comprises at least one of vertical, horizontal, circular, or different angles of polarization utilized for communication with at least one downstream access point to reduce interference from other devices.

21. A wireless network access device as recited in claim 18, comprising a gateway supplying internet access to the wireless network from a T3 or other high-speed internet connection, said first wireless modem communicating with at least one other wireless network access device or said gateway serving as an upstream access point for establishing a bridge from the customer premise to said gateway.

22. A wireless network access device as recited in claim 18, wherein said directional antenna and said omni-directional antenna each comprise low power transmission broadcast capabilities allowing for frequency reuse within a relatively small operating area.

23. A wireless network access device comprising:

a first wireless modem;

a first directional antenna connected to said first wireless modem for communication with at least one other wireless network access device serving as an upstream access point;

a second wireless modem;

an omni-directional antenna connected to said second wireless modem for downstream broadcast;

a first interface adapted for conveying bidirectional data signals with said first wireless modem;

a second interface for conveying bidirectional data signals with said first interface;

a hub for switching bidirectional data signals from said second wireless modem to said second interface; and a gateway supplying internet access to the wireless network from a T3 or other high-speed internet connection, said first wireless modem communicating with at least one other wireless network access device or said gateway serving as an upstream access point for establishing a bridge from the customer premise to said gateway;

wherein said bridge comprises one or more filters in place operable with a lower level protocol supporting TCP/IP traffic on the network such that each customer may only establish a communication path to said gateway, thereby prohibiting establishment of communication paths with other customers.

24. A wireless network access device, comprising:

a first wireless modem;

a first directional antenna connected to said first wireless modem for communication with at least one other wireless network access device serving as an upstream access point;

a second wireless modem;

an omni-directional antenna connected to said second wireless modem for downstream broadcast;

a first interface adapted for conveying bidirectional data signals with said first wireless modem;

a second interface for conveying bidirectional data signals with said first interface;

a hub for switching bidirectional data signals from said second wireless modem to said second interface; and a gateway supplying internet access to the wireless network from a T3 or other high-speed internet connection, said first wireless modem communicating with at least one other wireless network access device or said gateway serving as an upstream access point for establishing a bridge from the customer premise to said gateway;

wherein said gateway comprises virtual private network (VPN) service across said bridge for security from the customer premise to the other side of said gateway.

25. A wireless network access device as recited in claim 24, comprising a packet shaper to dynamically adjust connection speeds based upon network utilization to provide bandwidth management on a per customer basis.

26. A wireless network access device as recited in claim 24, comprising:

a third wireless modem; and a second directional antenna connected to said second wireless modem for communication with at least one downstream access point.

27. A wireless network access device as recited in claim 24, wherein said second directional antenna comprises at least one of vertical, horizontal, circular, or different angles of polarization utilized for communication with at least one downstream access point to reduce interference from other devices.

28. A wireless network access device as recited in claim 24, wherein said directional antenna and said omni-directional antenna each comprise low power transmission broadcast capabilities allowing for frequency reuse within a small operating area.

29. A wireless network access system, comprising:

a multiplicity of access point devices, each being capable of relaying information from at least one of said other access point devices, the wireless network being provided as a tree structure wherein each access point device feeds back to a higher access point device of said multiplicity of access point devices; wherein said multiplicity of access point devices comprise a bridge, instead of a router, to a gateway or router, thereby avoiding announcement and IP routing latency, and a multiplicity of customer premise wireless network access devices comprising a multiplicity of wireless modems, directional antennas connected to the wireless modems and interfaces adapted for conveying data signals, and wherein at least one access point device comprises;

a first wireless modem, a first directional antenna connected said first wireless modem, and a first interface adapted for conveying bidirectional data signals via the customer premise to said first wireless modem, said first wireless modem and said first directional antenna being located at the customer premise.

30. A wireless network access system as recited in claim 29, wherein at least one of said access point devices comprises:
   a second wireless modem;
   a second directional antenna connected to said first wireless modem for communication with at least one other wireless network access device serving as an upstream access point;
   a third wireless modem;
   an omni-directional antenna connected to said third wireless modem for downstream broadcast;
   a first splitter adapted for conveying bidirectional data signals with said second wireless modem;
   a second splitter for conveying bidirectional data signals with said first splitter; and
   a hub for switching bidirectional data signals from said third wireless modem to said second sputter.

31. A wireless network access device as recited in claim 30, comprising a gateway supplying internet access to the wireless network from a T3 or other high-speed internet connection, said first wireless modern communicating with at least one other wireless network access device or said gateway serving as an upstream access point for establishing a bridge from the customer premise to said gateway.

32. A wireless network access device as recited in claim 31, wherein said gateway comprises virtual private network (VPN) service across said bridge for security from the customer premise to the other side of said gateway.

33. A wireless network access system, comprising:
   a multiplicity of access point: devices, each being capable of relaying information from at least one of said other access point devices, the wireless network being provided as a tree structure wherein each access point feeds back to a higher access point of said multiplicity of access point devices; and a multiplicity of customer premise wireless network access devices, each said access device comprising:
      a first wireless modem, a directional antenna connected to said first wireless modem, an interface adapted for conveying bidirectional data signals via the customer premise to said first wireless modem, said first wireless modem and said directional antenna being locatable at the customer premise device; and
   wherein the wireless network access system further comprises a gateway supplying internet access to the wireless network from a T3 or other high-speed internet connection, said first wireless modem communicating with at least one other wireless network access device or said gateway serving as an upstream access point for establishing a bridge from the customer premise to said gateway,
   wherein at least one of said access point devices comprises:
   a second wireless modem;
   a second directional antenna connected to said first wireless modem for communication with at least one other wireless network access device serving as an upstream access point;
   a third wireless modem;
   an omni-directional antenna connected to said third wireless modem for downstream broadcast;
   a first splitter adapted for conveying bidirectional data signals with said second wireless modem;
   a second splitter for conveying bidirectional data signals with said first splitter; and
   a hub for switching bidirectional data signals from said third wireless modem to said second splitter,
   wherein said bridge comprises one or more filters in place operable with a lower level protocol supporting TCP/IP traffic on the network such that each customer may only establish a communication path to said gateway, hereby prohibiting establishment of communication paths with other customers.

34. A wireless network access method, comprising:
   providing a multiplicity of access point devices to the wireless network in a tree structure wherein each access point feeds back to a higher access point of the multiplicity of access point devices;
   providing a multiplicity of customer premise wireless network access devices having a wireless modem, a directional antenna, and an interface adapted for conveying bidirectional data signals via the customer premise wireless modem to at least one of the multiplicity of access point devices as an uplink to the main gateway for supplying a high-speed internet connection to the wireless network; and
   relaying information from one of the customer premise wireless network access devices through at least one of the multiplicity of access point devices to establish a bridge from the customer premise to the main gateway or to a router, such that said relaying comprises bridging to said gateway or router, instead of routing, thereby avoiding announcement and IP routing latency.

35. A wireless network access method as recited in claim 34, comprising establishing a virtual private network (VPN) service across the ridge for security from a customer premise to the other side of the main gateway.

36. A wireless network access method as recited in claim 34, comprising disabling security features to allow for roaming.

37. A wireless network access method as recited in claim 34, wherein the wireless modem and directional antenna of them multiplicity of customer premise wireless network access devices provide low power transmission capabilities for frequency reuse within an operating area for relaying information from the access devices.

38. A wireless network access method, comprising:
   providing a multiplicity of access point devices to the wireless network in a tree structure wherein each access point feeds back to a higher access point of the multiplicity of access point devices;
   providing a multiplicity of customer premise wireless network access devices having a wireless modem, a directional antenna, and an interface adapted for conveying bidirectional data signals via the customer premise wireless modem to at least one of the multiplicity of access point devices as an unlink to the main gateway for supplying a high-speed internet connection to the wireless network;
   relaying information from one of the customer premise wireless network access devices through at least one of the multiplicity of access point devices to establish a bridge from the customer premise to the main gateway; and disabling security features to allow for roaming, wherein each of the multiplicity of access point devices for relaying information is provided with the same extended service set identification (ESSID) across all relay points of the wireless network communities, with roaming software being provided for each customer premise to establish security for allowing for roaming.

39. A wireless network access method, comprising:

providing a multiplicity of access point devices to the wireless network in a tree structure wherein each access point feeds back to a higher access point of the multiplicity of access point devices;

providing a multiplicity of customer premise wireless network access devices having a wireless modem, a directional antenna, and an interface adapted for conveying bidirectional data signals via the customer premise wireless modem to at least one of the multiplicity of access point devices as an uplink to the main gateway for supplying a high-speed internet connection to the wireless network;

relaying information from one of the customer premise wireless network access devices through at least one of the multiplicity of access point devices to establish a bridge from the customer premise to the main gateway; and adding filters operable at a lower level capable of supporting TCP/IF facilitating communication from each customer only to the main gateway, thereby prohibiting the establishment of communication links directly between customers.

40. A wireless network access method, comprising:

providing a multiplicity of access point devices to the wireless network in a tree structure wherein each access point feeds back to a higher access point of the multiplicity of access point devices;

providing a multiplicity of customer premise wireless network access devices having a wireless modem, a directional antenna, and an interface adapted for conveying bidirectional data signals via the customer premise wireless modem to at least one of the multiplicity of access point devices as an uplink to the main gateway for supplying a high-speed internet connection to the wireless network;

relaying information form one of the customer premise wireless network access devices through at least one of the multiplicity of access point devices to establish a bridge from the customer premise to the main gateway;

establishing a virtual private network (VPN) service across the bridge for security from a customer premise to the other side of the main gateway; and performing packet shaping to dynamically adjust connection speeds based upon network utilization to manage bandwidth on a per customer basis.

* * * * *